(12) United States Patent
Shim et al.

(10) Patent No.: US 9,768,456 B1
(45) Date of Patent: Sep. 19, 2017

(54) FUEL CELL CONTROL METHOD AND APPARATUS THROUGH ESTIMATION OF AMOUNT OF WATER

(71) Applicant: Hyundai Motor Company, Seoul (KR)

(72) Inventors: Jae Young Shim, Gyeonggi-do (KR);
Young Pin Jin, Gyeonggi-do (KR);
Kang Sik Jeon, Gyeonggi-do (KR);
Sung Ho Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/191,727

(22) Filed: Jun. 24, 2016

(30) Foreign Application Priority Data

Mar. 15, 2016 (KR) .......................... 10-2016-0030825

(51) Int. Cl.
*H01M 8/04* (2016.01)
*H01M 8/04828* (2016.01)
*H01M 8/04291* (2016.01)
*H01M 8/04119* (2016.01)
*H01M 8/04492* (2016.01)
*H01M 8/04746* (2016.01)

(52) U.S. Cl.
CPC ... *H01M 8/04835* (2013.01); *H01M 8/04126* (2013.01); *H01M 8/04156* (2013.01); *H01M 8/04291* (2013.01); *H01M 8/04522* (2013.01); *H01M 8/04753* (2013.01); *H01M 2250/20* (2013.01)

(58) Field of Classification Search
CPC ............... H01M 8/04119; H01M 8/04; H01M 8/04126; H01M 8/04141; H01M 8/04156; H01M 8/04164; H01M 8/04179; H01M 8/04291; H01M 8/04492; H01M 8/045; H01M 8/04507; H01M 8/04514; H01M 8/04522
See application file for complete search history.

(56) References Cited

U.S. PATENT DOCUMENTS

| | | | |
|---|---|---|---|
| 2008/0088043 | A1 | 4/2008 | Daisuke |
| 2012/0148927 | A1* | 6/2012 | Jeon .................. H01M 8/04992 429/414 |

FOREIGN PATENT DOCUMENTS

| | | |
|---|---|---|
| JP | 2004-158274 A | 6/2004 |
| JP | 2004-207139 A | 7/2004 |
| JP | 2008-066041 A | 3/2008 |
| JP | 2013-239290 A | 11/2013 |
| KR | 10-1293961 B1 | 8/2013 |

* cited by examiner

*Primary Examiner* — Carlos Barcena
(74) *Attorney, Agent, or Firm* — Mintz Levin Cohn Ferris Glovsky and Popeo, P.C.; Peter F. Corless

(57) ABSTRACT

A fuel cell control method includes calculating an amount of water in a humidifier using a production amount of water at a cathode of a fuel cell, a discharge amount of saturated vapor and a discharge amount of water at an anode, judging whether or not a vehicle is in a driving state using state information of the vehicle, judging humidity of air in the fuel cell stack upon judging that the vehicle is in the driving state, increasing RPM of an air blower and activating the air blower when the amount of water is greater than a first threshold and a second condition is satisfied, if first conditions are satisfied, and activating a heater when the amount of water is greater than a second threshold, if the first conditions are not satisfied.

21 Claims, 5 Drawing Sheets

FUEL CELL CONTROL METHOD AND APPARATUS THROUGH ESTIMATION OF AMOUNT OF WATER

CROSS-REFERENCE TO RELATED APPLICATION

This application claims under 35 U.S.C. §119(a) the benefit of Korean Patent Application No. 10-2016-0030825, filed on Mar. 15, 2016, which is incorporated by reference herein.

BACKGROUND (a) Field of the Invention

The present invention relates to a fuel cell vehicle, and more particularly, to a method and apparatus of increasing output efficiency of a fuel cell system by estimating an amount of water within the fuel cell system.

(b) Description of the Related Art

A fuel cell system is a type of power generation system which converts chemical energy of a fuel directly into electric energy within a fuel cell stack. A fuel cell vehicle using such a fuel cell system has advantages, such as reduction in exhaust gas and improvement in fuel efficiency, but in consideration of disadvantages of the fuel cell system, such as production of water and power performance, a fuel cell hybrid system having a power storage unit, i.e., another energy storage device differing from the fuel cell, is employed. A fuel cell hybrid vehicle may be equipped with a power storage unit, i.e., a high voltage battery or a super capacitor (supercap), as a separate power source for providing power necessary to drive a motor, in addition to a fuel cell as a main power source.

A fuel cell system mounted in the fuel cell hybrid vehicle includes a fuel cell stack to generate electric energy, a hydrogen supply device to supply hydrogen as a fuel to the fuel cell stack, an air (oxygen) supply device to supply oxygen in air as an oxidant necessary for an electrochemical reaction to the fuel cell stack, a thermal management system (TMS) which discharges heat of reaction of the fuel cell stack to the outside of the system, controls the driving temperature of the fuel cell stack and performs a water management function, and a fuel cell system controller to control the overall operation of the fuel cell system. Through such a configuration, the fuel cell system generates electricity by reaction between hydrogen serving as the fuel and oxygen in air, and discharges heat and water as by-products of the reaction.

A Proton Exchange Membrane Fuel Cell or Polymer Electrolyte Membrane Fuel Cell (PEMFC) has been identified for use in vehicles as a type of fuel cell having the highest power density, and the PEMFC has a short starting time and a short power conversion reaction time due to the low operating temperature thereof.

A fuel cell stack mounted in the PEMFC includes a Membrane Electrode Assembly (MEA) in which electrode/catalyst layers in which electrochemical reaction occurs are attached to both surfaces of a polymer electrolyte membrane to which hydrogen ions are moved, a Gas Diffusion Layer (GDL) serving to uniformly distribute reaction gases and to transmit generated electricity, gaskets and clamps to maintain air-tightness and proper clamping pressures of the reaction gases and cooling water, and a bipolar plate to move the reaction gases and the cooling water, and generates current by fuel cell reaction when hydrogen and oxygen (air) are supplied.

In the fuel cell stack, hydrogen is supplied to an anode (referred to as a "fuel electrode"), and oxygen (air) is supplied to a cathode (referred to as an "air electrode" or "oxygen electrode").

Hydrogen supplied to the anode is separated into protons ($H^+$) and electrons ($e^-$) by the catalyst of the electrode layers formed on both surfaces of the electrolyte membrane and only the protons ($H^+$) pass through the electrolyte membrane, i.e., a cation exchange membrane, and are transmitted to the cathode and, simultaneously, the electrons ($e^-$) are transmitted to the cathode through the GDL and the bipolar plate, formed of a conductor.

In particular, in the cathode, protons ($H^+$) supplied to the cathode through the electrolyte membrane and electrons ($e^-$) transmitted to the cathode through the bipolar plate meet oxygen in air supplied to the cathode by the air supply device, thus producing water.

A flow of electrons ($e^-$) through an external wire is generated according to movement of protons ($H^+$) and such a flow of electrons ($e^-$) generates current. Further, heat is subordinately generated during water production reaction.

Reactions at the electrodes of the PEMFC will be described, as follows.

[Reaction at Anode] $2H_2 \rightarrow 4H^+ + 4e^-$

[Reaction at Cathode] $O_2 + 4H^+ + 4e^- \rightarrow 2H_2O$

[Overall Reaction] $2H_2 + O_2 \rightarrow 2H_2O +$ electric energy + thermal energy In the above reaction, protons ($H^+$) should pass through a polymer membrane, membrane permeability of protons ($H^+$) is determined by a function of water content and, as the reaction progresses, water is produced and humidifies the reaction gases and the membrane.

If the reaction gases are dry, the entirety of water produced by the reaction is used to humidify air and thus the polymer membrane runs dry. Therefore, in order to properly drive a fuel cell, the polymer membrane should be kept humid. The reason for this is that membrane permeability of protons ($H^+$) is determined by a function of water contained in the membrane.

On the other hand, if the membrane is excessively wet, pores of the Gas Diffusion Layer (hereinafter, referred to as "GDL") are clogged and the reaction gases may not contact a catalyst. As a result, maintaining of a proper amount of water in the membrane is very important.

Therefore, in order to improve performance of a sulfonated fluoropolymer membrane serving to perform a function of exchanging protons ($H^+$) in a polymer electrolyte membrane fuel cell, the membrane should contain a proper amount of water.

Although a fuel cell receives air in the atmosphere, instead of pure oxygen as an oxidant, air in the atmosphere is not generally humid enough to wet a membrane thoroughly. Therefore, the air must be sufficiently humidified so as to smoothly operate the fuel cell, prior to supply of the air in the atmosphere to the fuel cell.

Due to these characteristics, it is necessary to supply air containing a proper amount of water to the fuel cell, and in many fuel cell vehicles, air humidified by a humidification system is supplied to a stack. Further, a humidifier used in fuel cell vehicles is of a passive type which is continuously humidified by water (vapor) produced from chemical reaction in a stack.

However, an excessive amount of water (i.e., produced water) may occur within the humidifier during both general driving of a vehicle and in a constant current mode, known as a mode which is advantageous for humidification (a driving mode in which output current of a fuel cell is fixed to a constant value).

Accumulation of the excessive amount of water in the humidifier may cause problems, such as lowering of humidification efficiency, cell voltage sudden decrease during driving of a vehicle, blockage of an air flow path to a stack due to freezing of water within the humidifier in winter, and physical damage to the humidifier.

Therefore, a method of effectively controlling a fuel cell system in which the above-described problems are prevented by solving accumulation of an excessive amount of water in a humidifier while maintaining proper humidity of air of a fuel cell stack is required.

SUMMARY

An object of the present invention is to provide a fuel cell control method and apparatus through estimation of an amount of water in which a fuel cell system is effectively controlled by estimating the amount of water within a humidifier of the fuel cell system and properly using or removing excessively accumulated water.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a fuel cell control apparatus includes calculating an amount of water in a humidifier using a production amount of water at a cathode of a fuel cell, a discharge amount of saturated vapor and a discharge amount of water at an anode, judging whether or not a vehicle is in a driving state using state information of the vehicle, judging humidity of air in the fuel cell stack, upon judging that the vehicle is in the driving state, increasing the RPM of an air blower from a first RPM to a second RPM and activating the air blower when the amount of water in the humidifier is greater than a first threshold and a second condition satisfied, if the humidity of air in the fuel cell stack satisfies first conditions, and activating a heater in the humidifier when the amount of water in the humidifier is greater than a second threshold, if the humidity of air in the fuel cell stack does not satisfy the first conditions, wherein the first RPM is varied based on an air Stoichiometric Ratio (SR).

The first conditions may be satisfied if the humidity of air in the fuel cell stack is higher than a threshold humidity.

The second condition may be satisfied if the vehicle is braked.

The fuel cell control method may further include, upon judging that the vehicle is not in the driving state, increasing the RPM of the air blower from the first RPM to the second RPM and activating the air blower when the amount of water in the humidifier is greater than the first threshold.

Calculation of the amount of water in the humidifier using the production amount of water at the cathode of the fuel cell, the discharge amount of saturated vapor and the discharge amount of water at the anode may include calculating the production amount of water at the cathode using a current amount of the fuel cell stack and a chemical reaction time in the fuel cell stack.

Calculation of the amount of water in the humidifier using the production amount of water at the cathode of the fuel cell, the discharge amount of saturated vapor and the discharge amount of water at the anode may include calculating the discharge amount of saturated vapor using a temperature of the fuel cell stack and a flow rate of discharged air, and the flow rate of discharged air may be calculated using the RPM of the air blower and an opening angle of an air pressure adjustment valve.

Calculation of the amount of water in the humidifier using the production amount of water at the cathode of the fuel cell, the discharge amount of saturated vapor and the discharge amount of water at the anode may further include calculating an amount of saturated vapor using a map of saturated vapor distribution according to temperatures of the fuel cell stack and flow rates of discharged air and calculating the flow rate of discharged air using a map of flow rates of discharged air according to RPMs of the air blower and opening angles of the air pressure adjustment valve.

Calculation of the amount of water in the humidifier using the production amount of water at the cathode of the fuel cell, the discharge amount of saturated vapor and the discharge amount of water at the anode may further include calculating the discharge amount of saturated vapor based on a discharged water amount correction factor based on a gradient of the vehicle.

Calculation of the amount of water in the humidifier using the production amount of water at the cathode of the fuel cell, the discharge amount of saturated vapor and the discharge amount of water at the anode may include calculating the discharge amount of water at the anode using the number of operations of a drain valve, an operating time of the drain valve, and a discharge pressure.

Calculation of the discharge amount of water at the anode using the number of operations of the drain valve, the operating time of the drain valve, and the discharge pressure may further include calculating the discharge amount of water at the anode using a map of discharge amounts of water at the anode according to the numbers of operations of the drain valve, operating times of the drain valve, and discharge pressures.

In another aspect of the present invention, there is provided a computer readable recording medium to record a program to execute the above-described fuel cell control method.

In yet another aspect of the present invention, a fuel cell control apparatus includes a communication unit configured to receive information about a fuel cell stack and state information of a vehicle, a memory configured to store information received from the communication unit, and a controller configured to calculate an amount of water in a humidifier using a production amount of water at a cathode of a fuel cell, a discharge amount of saturated vapor and a discharge amount of water at an anode, to judge humidity of air in the fuel cell stack if the vehicle is in a driving state, and to increase the RPM of an air blower from a first RPM to a second RPM and activates the air blower when the amount of water in the humidifier is greater than a first threshold and at least a second condition is satisfied, if the humidity of air in the fuel cell stack satisfies first conditions, or to activate a heater in the humidifier when the amount of water in the humidifier is greater than a second threshold, if the humidity of air in the fuel cell stack does not satisfy the first conditions, wherein the first RPM is varied based on an air Stoichiometric Ratio (SR).

The controller may judge that the first conditions are satisfied if the humidity of air in the fuel cell stack is higher than a threshold humidity.

The controller may judge that the second condition is satisfied if the vehicle is braked.

If the vehicle is not in the driving state, the controller may increase the RPM of the air blower from the first RPM to the second RPM and activate the air blower when the amount of water in the humidifier is greater than the first threshold.

The controller may calculate the production amount of water at the cathode using a current amount of the fuel cell stack and a chemical reaction time in the fuel cell stack.

The controller may calculate the discharge amount of saturated vapor using a temperature of the fuel cell stack and a flow rate of discharged air and calculate the flow rate of discharged air using the RPM of the air blower and an opening angle of an air pressure adjustment valve.

The controller may calculate an amount of saturated vapor using a map of saturated vapor distribution according to temperatures of the fuel cell stack and flow rates of discharged air and calculate the flow rate of discharged air using a map of flow rates of discharged air according to RPMs of the air blower and opening angles of the air pressure adjustment valve.

The controller may calculate the discharge amount of saturated vapor based on a discharged water amount correction factor based on a gradient of the vehicle.

The controller may calculate the discharge amount of water at the anode using the number of operations of a drain valve, an operating time of the drain valve, and a discharge pressure.

The controller may calculate the discharge amount of water at the anode using a map of discharge amounts of water at the anode according to the numbers of operations of the drain valve, operating times of the drain valve, and discharge pressures.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
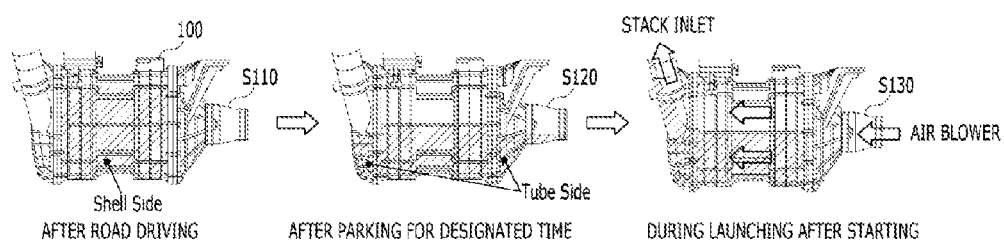
FIG. 1 is a view illustrating flooding caused by excessively accumulated water within a humidifier in respective situations in a conventional fuel cell system.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention provides a method and apparatus which calculate an amount of water accumulated in a humidifier within a fuel cell system while properly maintaining humidity of air of a fuel cell stack, and thus use or remove an amount of water produced in fuel cell reaction so as to increase power generation efficiency of the fuel cell system.

Prior to detailed description of the present invention, problems caused by water accumulated in a conventional fuel cell system will be described with reference to FIGS. 1 and 2, and then a fuel cell control method and apparatus through estimation of an amount of water in accordance with an exemplary embodiment of the present invention will be described with reference to FIGS. 3 to 6.

Figure 2:
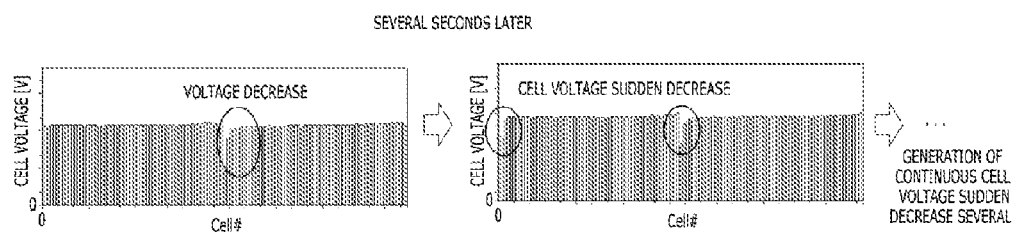
FIG. 2 is a view illustrating a cell voltage sudden decrease due to flooding that occurs in the conventional fuel cell system of FIG. 1.

FIG. 1 is a view illustrating flooding caused by excessively accumulated water within a humidifier in respective situations in a conventional fuel cell system, and FIG. 2 is a view illustrating cell voltage sudden decrease due to flooding in the conventional fuel cell system of FIG. 1.

With reference to FIG. 1, the fuel cell system may include a humidifier 100 connected to a stack, and an air blower. The air blower serves to supply air to the stack, and humidity of air supplied to the stack is properly adjusted by the humidifier installed between the air blower and the stack.

The air blower may change revolutions per minute (RPM) according to a gas ratio of hydrogen to oxygen and thus vary an amount of air supplied to a cathode so as to properly generate an electrochemical reaction in a fuel cell. That is, the RPM of the air blower continues to properly increase and decrease according to a Stoichiometric Ratio (SR) of air depending on a given situation.

In accordance the present invention, the humidifier is a passive type humidifier which evaporates water accumulated in a shell side into air and provides air humidified by vapor to the stack.

In Operation S110 of FIG. 1, water produced by electrochemical reaction between hydrogen and oxygen at a cathode of the fuel cell stack is accumulated at the shell side of the humidifier.

In both a general driving state and a constant current state known as a state which is advantageous for humidification (a driving state without sudden acceleration), accumulation of an excessive amount of produced water may occur.

In Operation S120 of FIG. 1, after a fuel cell vehicle having the fuel cell system is parked for a designated time, tube sides absorb water from the shell side of the humidifier.

Thereafter, in Operation S130 of FIG. 1, if the air blower supplies air to the stack, water at the tube side may be introduced into the stack.

That is to say, in Operation S130 of FIG. 1, flooding may occur in which water at the shell side is absorbed by the tube side serving as an air flow path towards the stack under the condition that produced water excessively accumulated in the humidifier is not removed and, thus when the air blower is operated, the water is introduced into the stack.

With reference to FIG. 2, one of the representative problems caused by flooding is cell voltage sudden decrease.

Cell voltage sudden decrease refers to sudden decrease in power output from some of a plurality of unit cells and such cell voltage sudden decrease occurs due to water introduced into the stack when the air blower is operated.

That is, produced water accumulated at the shell side of the humidifier is absorbed by the tube side a designated time later after driving for a long time (2-4 hours) without sudden acceleration and, thereafter, if water accumulated and collected at the tube side is temporarily introduced into the stack at the initial stage of driving, flooding at cells at the air blower occurs and thus sudden current limit may occur. Such flooding may lower vehicle drivability and have a bad influence on stack durability.

Further, when water at the shell side absorbed by the tube side freezes in the humidifier in cold weather (e.g., winter conditions), a hollow fiber membrane may be warped due to volume expansion, and the tube side serving as the air flow path towards the stack may be closed by freezing of water, thus preventing air introduction into the fuel cell stack and lowering output efficiency.

In conventional fuel cell systems, technology, in which water accumulated in a humidifier (produced water) is considered, is not known but Cold Shut Down (CSD) technology, in which an air blower is operated to blow air at a specific RPM for a designated time or more so as to prevent water in a stack (remaining water) from freezing (to assure cold-start enhancement) when starting of a vehicle is turned off in winter, is used.

However, when CSD technology is applied, among a discharged amount of produced water, water in the stack occupies only less than 10% and water accumulated in the humidifier occupies 90% or more. Further, in order to reduce generation of noise caused by the air blower, measures to obviate CSD technology are being considered but there is no other way unless freezing of produced water in the humidifier is overcome. Moreover, accumulating tendencies of the amount of water in the stack and the amount of water in the humidifier are different, and a possibility of freezing of water in the humidifier in winter still exists due to application of conventional CSD technology based on the amount of water in the stack.

Therefore, the present invention provides a fuel cell control method and apparatus through estimation of an amount of water in which an amount of water in a humidifier, rather than an amount of water in a stack, is estimated and water produced by electrochemical reaction of a fuel cell is used to adjust humidity of air supplied to the stack through a heater, or excessively accumulated water is removed through an air blower of a high RPM according to the estimated amount of water in the humidifier.

Figure 3:
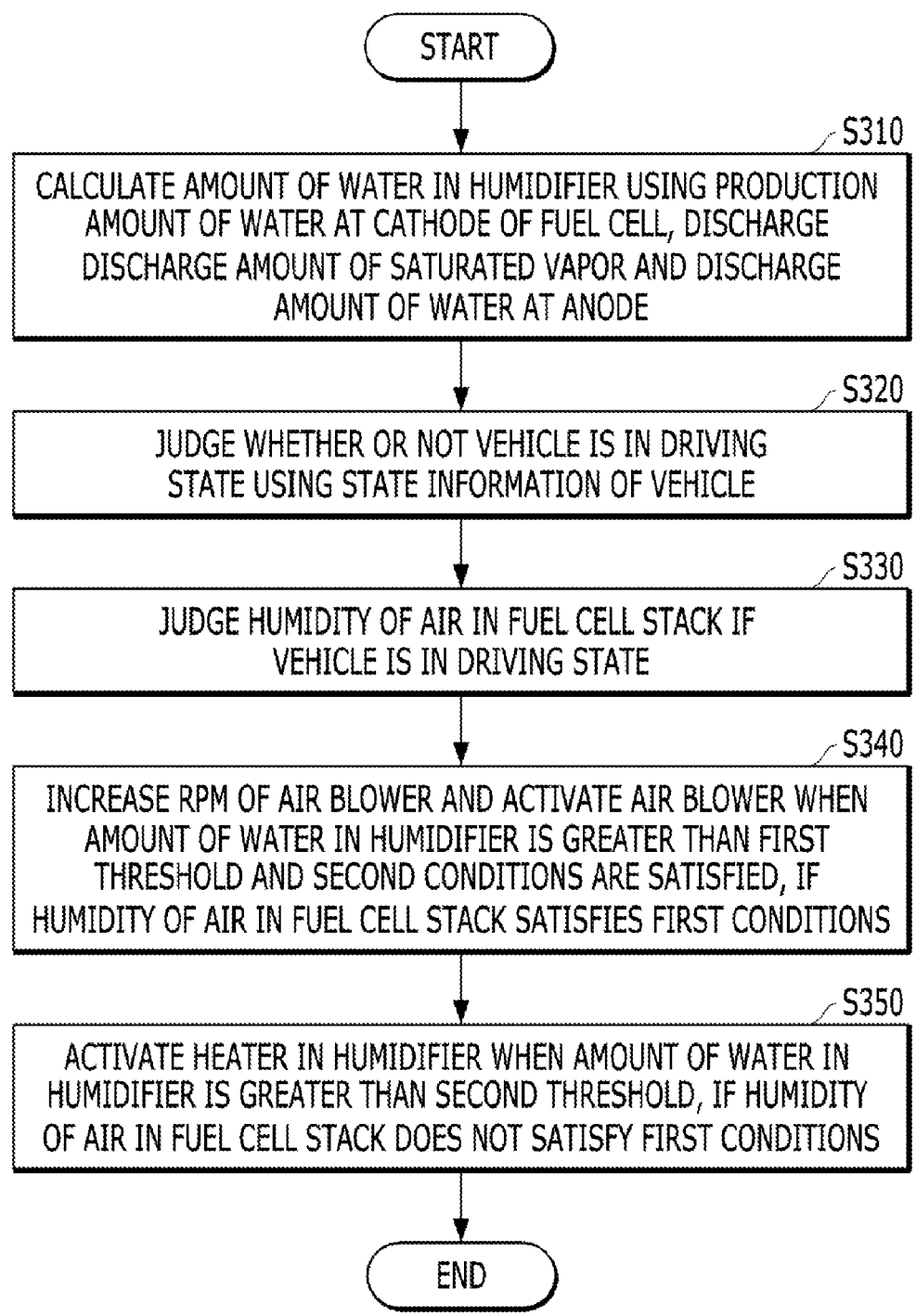
FIG. 3 is a flowchart illustrating a fuel cell control method through estimation of an amount of water in accordance with an exemplary embodiment of the present invention.

FIG. 3 is a flowchart illustrating a fuel cell control method through estimation of an amount of water in accordance with an exemplary embodiment of the present invention.

A fuel cell control apparatus calculates an amount of water in a humidifier using a production amount of water at a cathode of a fuel cell, a discharge amount of saturated vapor and a discharge amount of water at an anode (Operation S310).

An amount of water in the humidifier may be determined by a production amount of water at the cathode of the fuel cell, a discharge amount of saturated vapor and a discharge amount of water at the anode.

At the cathode, protons supplied through an electrolyte membrane and electrons transmitted through a bipolar plate meet oxygen in air supplied to the cathode by an air blower, and thus water is produced. Therefore, a production amount of water at the cathode is considered when an amount of water in the humidifier is calculated.

A discharge amount of saturated vapor is considered as an amount of water discharged from the amount of water in the humidifier.

A discharge amount of water at the anode is used to consider water which is produced at the cathode, moves to the anode through the electrolyte membrane, and is then discharged from the anode. Water discharged from the anode may be stored in a water trap by a drain and discharged through a drain valve.

A method of calculating the amount of water in the humidifier will be described below with reference to FIG. 5.

The fuel cell control apparatus judges whether or not a fuel cell vehicle is in a driving state using state information of the vehicle (Operation S320).

If the vehicle is not in the driving state, when the amount of water in the humidifier is a designated amount or more using CDS, the RPM of the air blower may be increased to discharge water to the outside.

However, the main object of the present invention is to operate a heater in the humidifier or the air blower so as to prevent cell voltage sudden decrease generated due to the amount of water in the humidifier while properly adjusting humidity of air in the fuel cell stack even if the vehicle is being driven.

The fuel cell control apparatus judges humidity of air in the fuel cell stack, if the vehicle is in the driving state (Operation S330).

In an electrochemical reaction occurring in the stack, protons should pass through a polymer membrane, membrane permeability of protons is determined by a function of a water content and, in order to properly drive a fuel cell, the polymer membrane should be kept humid.

If reaction gases are dry, the entire amount of water produced by the reaction is used to humidify air, and thus the polymer membrane runs dry. In contrast, if the membrane is excessively wet, pores of a Gas Diffusion Layer (hereinafter, referred to as "GDL") are clogged and the reaction gases may not contact a catalyst. For this reason, it is very important to maintain proper water content of the membrane.

As a result of judgment of humidity of air in the fuel cell stack, if the amount of water in the humidifier is large in a situation in which proper humidity in the fuel cell stack is not maintained (in a dry state), water in the humidifier is evaporated by a heater and, if the amount of water in the humidifier is large in a situation in which proper humidity in the fuel cell stack is maintained, water is discharged to the outside by the air blower of a high RPM, thereby maintaining the proper humidity.

If humidity of air in the fuel cell stack satisfies first conditions, the fuel cell control apparatus increases the RPM of the air blower and then activates the air blower, when the amount of water in the humidifier is greater than a first threshold and second condition(s) is/are satisfied (Operation S340).

The first conditions (i.e., whether or not air in the fuel cell stack is dry, and whether or not air in the fuel cell stack is dry or humid) may be judged based on a threshold humidity. If air in the fuel cell stack is not dry, the first conditions may be satisfied.

The second condition(s) (e.g., whether or not the vehicle is braked) can be satisfied when the vehicle is braked, thereby utilizing regenerative braking energy from braking to increase the RPM of the air blower.

If air in the fuel cell stack has proper humidity, the first conditions may be satisfied, and if the first conditions are satisfied and the amount of water in the humidifier is greater than the first threshold, it is judged that an amount of accumulated water is large, the RPM of the air blower is increased from a first RPM to a second RPM, and then the air blower is activated, and thus accumulated water is discharged to the outside.

Here, the first RPM is an RPM of the air blower based on an air SR, a vehicle velocity, etc. so as to properly activate electrochemical reaction occurring in the fuel cell stack, and the second RPM is a higher RPM than the first RPM so as to discharge water in the humidifier to the outside.

Here, if the vehicle is braked, the second condition may be satisfied, and the air blower may be activated at the second RPM raised from the first RPM using regenerative braking energy generated when the vehicle is braked.

The fuel cell control apparatus may judge whether or not the vehicle is braked using state information of the vehicle. The state information of the vehicle may include velocity information and transmission information of the vehicle, etc.

However, the fuel cell control apparatus may not judge whether or not the vehicle is braked but may receive information as to whether or not the vehicle is braked from an external apparatus.

If humidity of air in the fuel cell stack does not satisfy the first conditions, the fuel cell control apparatus activates an inner heater of the humidifier when the amount of water in the humidifier is greater than a second threshold (Operation S350).

If air in the fuel cell stack is dry and thus does not satisfy the first conditions and it is judged that water in the humidifier is excessively accumulated, the fuel cell control apparatus activates the heater in the humidifier and thus induces evaporation of water in the humidifier.

Figure 4:
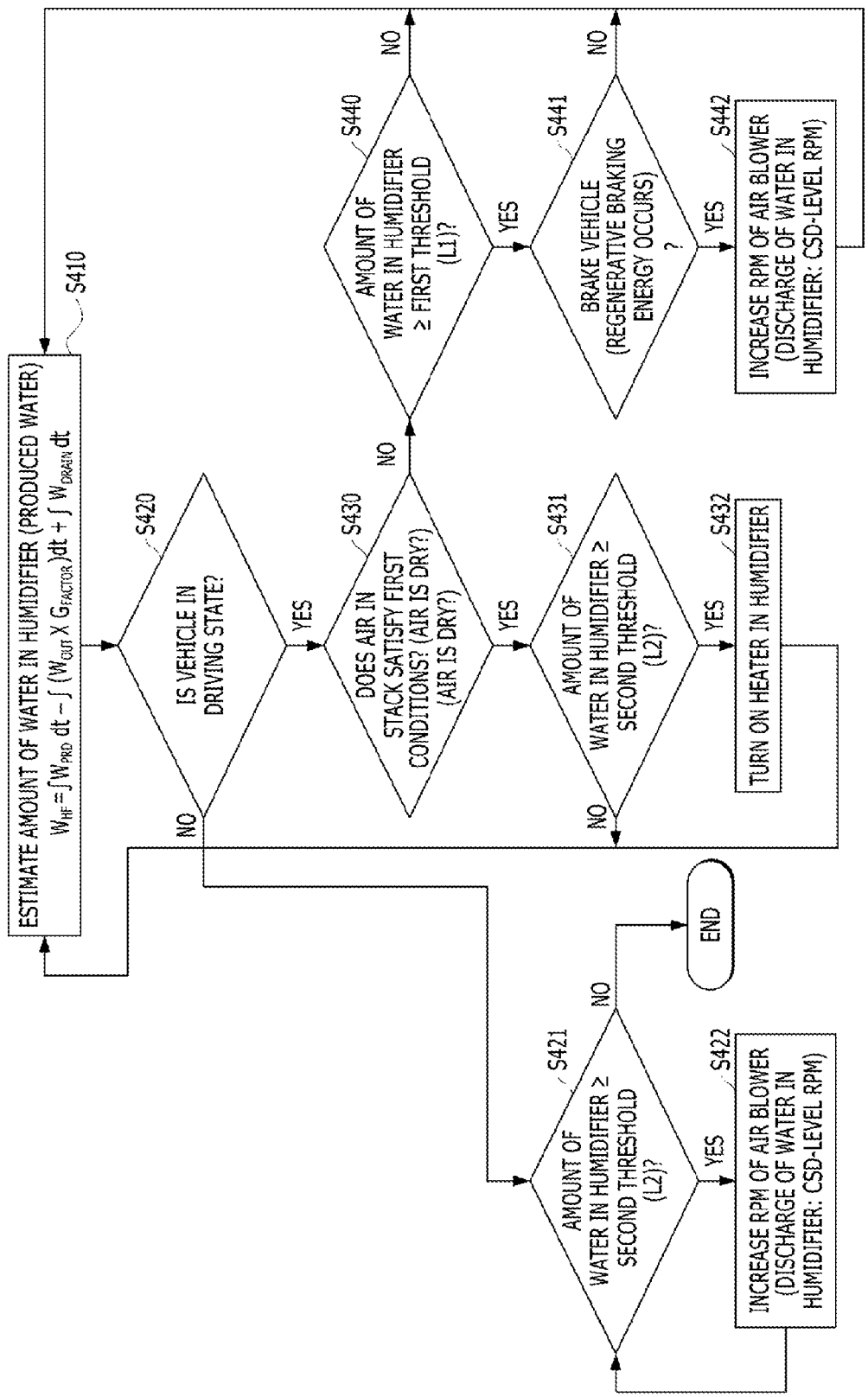
FIG. 4 is a flowchart illustrating a fuel cell control method through estimation of an amount of water in accordance with the exemplary embodiment of the present invention in greater detail as compared to FIG. 3.

FIG. 4 is a flowchart illustrating a fuel cell control method through estimation of an amount of water in accordance with the exemplary embodiment of the present invention in more detail.

With reference to FIG. 4, a fuel cell control apparatus estimates an amount of water in a humidifier (produced water) (Operation S410). As described above with reference to FIG. 3, the fuel cell control apparatus calculates the amount of water in the humidifier using a production amount of water at a cathode of a fuel cell, a discharge amount of saturated vapor, and a discharge amount of water at an anode.

The fuel cell control apparatus judges whether or not the vehicle is in a driving state or in a parked state using state information of a fuel cell vehicle (Operation S420).

If the vehicle is in the parked state, CSD technology in which an air blower is activated to prevent water in the fuel cell stack from freezing may be applied. In addition, whether or not the vehicle is in the driving state is judged so as to use or remove water excessively accumulated in the humidifier by activating the air blower or a heater in the humidifier, even in the driving state of the vehicle separately from the parked state of the vehicle.

If the vehicle is not in the driving state (No of Operation S420), the fuel cell control apparatus judges whether or not the amount of water in the humidifier is greater than a first threshold (Operation S421).

If the amount of water in the humidifier is greater than the first threshold in the parked state of the vehicle, water accumulated at the shell side of the humidifier is absorbed by the tube side and thus cell voltage sudden decrease may occur when the vehicle is started and, therefore, the fuel cell control apparatus increases the RPM of an air blower from a first RPM to a second RPM and activates the air blower at the second RPM to discharge water in the humidifier to the outside (Operation S422).

The state information of the vehicle may include velocity information and transmission information of the vehicle, etc., and the fuel cell control apparatus may judge whether or not the vehicle is in the driving state or in the parked state based on the state information.

If the vehicle is in the driving state, the fuel cell control apparatus judges whether or not humidity of air in the fuel cell stack satisfies first conditions (Operation S430).

Air in the fuel cell stack should maintain humidity allowing proper electrochemical reaction in the fuel cell. Therefore, the fuel cell control apparatus may judge whether or not air in the fuel cell stack is dry or humid by judging whether or not humidity of air in the fuel cell stack is higher than threshold humidity.

Further, a stack diagnostor mounted in the fuel cell system may judge whether or not air in the stack is dry/humid and transmit a result of judgment to the fuel cell control apparatus.

If humidity of air in the stack is lower than the threshold humidity and thus satisfies the first conditions (Yes of Operation of S430), the fuel cell control apparatus judges that air in the stack is dry and judges whether or not the amount of water in the humidifier is greater than a second threshold (Operation S431). If the amount of water in the humidifier is greater than the second threshold (Yes of Operation S431), the fuel cell control apparatus may activate the heater in the humidifier so as to induce evaporation of water in the humidifier to reduce the amount of water in the humidifier and to increase humidity of air in the stack due to evaporation (Operation S432).

If humidity of air in the stack is higher than the threshold humidity and thus does not satisfy the first conditions (No Operation of S430), the fuel cell control apparatus may judge that air in the stack has proper humidity to activate electrochemical reaction in the stack.

If humidity of air in the stack does not satisfy the first conditions and the amount of water in the humidifier is greater than the first threshold (Yes of Operation S440), the fuel cell control apparatus may increase the RPM of the air blower and then activate the air blower so as to discharge water in the humidifier to the outside (Operation S442).

Here, the fuel cell control apparatus may judge whether or not the vehicle is in the braked state (Yes of Operation S441) and increase the RPM of the air blower from a first RPM to a second RPM using regenerative braking energy generated in the braked state (Operation S442).

Figure 5:
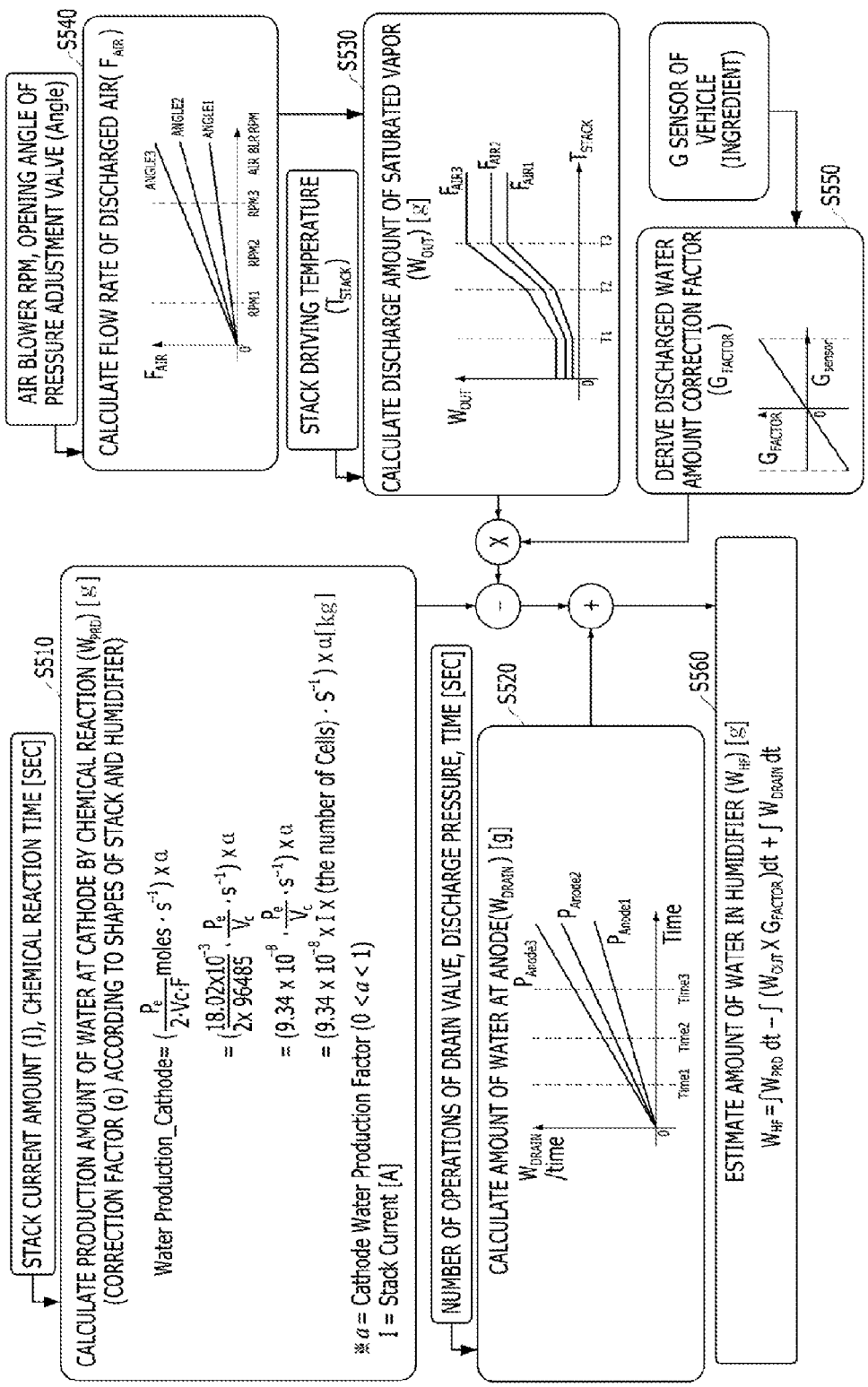
FIG. 5 is a view illustrating a method of estimating an amount of water within a humidifier in accordance with the exemplary embodiment of the present invention.

FIG. 5 is a view illustrating a method of estimating an amount of water within a humidifier in accordance with the exemplary embodiment of the present invention.

With reference to FIG. 5, factors for estimating the amount of water in the humidifier include: a production amount of water at a cathode of a fuel cell, a discharge amount of saturated vapor, and a discharge amount of water at an anode.

The production amount of water at the cathode may be determined by a current amount (I) of a fuel cell stack and a chemical reaction time.

The production amount of water at the cathode (Water Production_Cathode, $W_{PRD}$) by chemical reaction may be calculated by Equation 1 below (Operation S510).

Water Production_Cathode = [Equation 1]

$$\left(\frac{P_e}{2 \cdot V_c \cdot F} \text{moles} \cdot s^{-1}\right) \times \alpha = \left(\frac{18.02 \times 10^{-3}}{2 \times 96485} \cdot \frac{P_e}{V_c} \cdot s^{-1}\right) \times \alpha =$$

$$\left(9.34 \times 10^{-8} \cdot \frac{P_e}{V_c} \cdot s^{-1}\right) \times \alpha =$$

$$(9.34 \times 10^{-8} \times I \times (theNumberofCells) \cdot s^{-1}) \times \alpha [\text{kg}]$$

For example, if the number of cells is 434, a current amount (I) of the fuel cell stack is 100 A, a correction factor ($\alpha$) according to the shapes of the stack and the humidifier is 0.75 and a chemical reaction time is 1 second, 3 g of water may be produced based on Equation 1.

The discharge amount of water at the anode may be determined by the number of operations of a drain valve, a discharge pressure and a discharge time (Operation S520).

The discharge amount of water at the anode is used to consider water which is produced at the cathode, moves to the anode through an electrolyte membrane and is then discharged from the anode. Water discharged from the anode may be stored in a water trap by a drain and discharged through the drain valve.

The drain may serve to draw water discharged from the anode and store the water in the water trap, and the discharge amount of water at the anode may be increased according to the number of operations of the drain valve, the operating time of the valve and the discharge pressure.

In accordance with the exemplary embodiment, the fuel cell control apparatus may calculate the discharge amount of water at the anode using a map of discharge amounts of water at the anode according to the numbers of operations of the drain valve, operating times of the valve and discharge pressures of Operation S520.

The map of discharge amounts of water at the anode may be stored in a memory of the fuel cell control apparatus, and the amount of water discharged from the anode to the humidifier per drain may be detected using the map of discharge amounts of water at the anode.

The discharge amount of saturated vapor may be determined by a temperature of the fuel cell stack and a flow rate of discharged air (Operation S530).

The discharge amount of saturated vapor may be considered as an amount of water discharged from the amount of water in the humidifier.

Information about the temperature of the fuel cell stack may be received from a temperature sensor and the flow rate of discharged air may be calculated using the RPM of the air blower and the opening angle of an air pressure adjustment valve (Operation S540).

The fuel cell control apparatus may calculate the amount of saturated vapor using a map of saturated vapor distribution (i.e., amounts of saturated vapor) according to temperatures of the fuel cell stack and flow rates of discharged air of Operation S530.

Further, the fuel cell control apparatus may calculate the flow rate of discharged air using a map of flow rates of discharged air according to RPMs of the air blower and opening angles of the air pressure adjustment valve of Operation S540.

The discharge amount of saturated vapor may be calculated based on a discharged water amount correction factor based on a gradient of a vehicle (Operation S550).

The reason for this is that the amount of water discharged to the outside by the air blower varies according to the gradient and a G sensor for measuring the gradient may be a gyro sensor.

Figure 6:
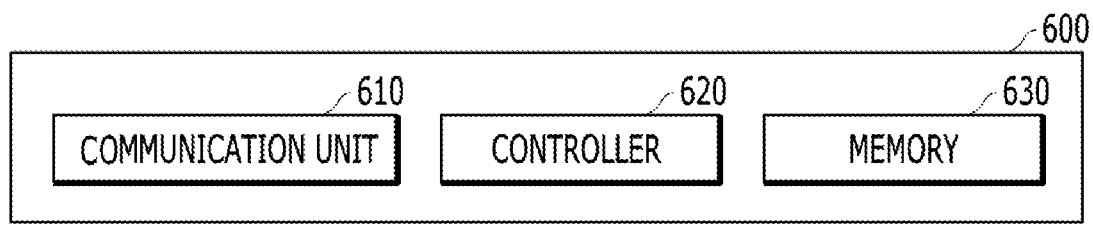
FIG. 6 is a block diagram illustrating a fuel cell control apparatus in accordance with the exemplary embodiment of the present invention.

FIG. 6 is a block diagram illustrating a fuel cell control apparatus 600 in accordance with the exemplary embodiment of the present invention.

With reference to FIG. 6, the fuel cell control apparatus 600 may include a communication unit 610, a controller 620 and a memory 630.

The elements shown in FIG. 6 are not essential and the fuel cell control apparatus 600 may include a larger number of elements or a smaller number of elements.

Hereinafter, the above-described elements will be described in detail.

The communication unit 610 receives information about a fuel cell stack to calculate an amount of water in a humidifier and state information of a vehicle to judge the driving state of the vehicle.

In accordance with the exemplary embodiment, the communication unit 610 receives information necessary for the fuel cell control apparatus to calculate the amount of water in the humidifier from a plurality of sensors and transmits control signals to control activation of a heater in the humidifier and an air blower.

The controller 620 may execute data processing and calculation to control the overall operation of the fuel cell control apparatus 600.

In accordance with the exemplary embodiment, the controller 620 calculates the amount of water in the humidifier using a production amount of water at a cathode of a fuel cell, a discharge amount of saturated vapor, and a discharge amount of water at an anode, judges humidity of air in the fuel cell stack if the vehicle is in the driving state, and increases the RPM of the air blower from a first RPM to a second RPM and then activates the air blower when the amount of water in the humidifier is greater than a first threshold and a second condition is satisfied if the humidity of air in the fuel cell stack satisfies first conditions, or activates a heater in the humidifier when the amount of water in the humidifier is greater than a second threshold if the humidity of air in the fuel cell stack does not satisfy the first conditions.

The memory 630 is a general space and/or storage area to store designated program code to control the overall operation of the fuel cell control apparatus 600 and data input/output when operation by the program code is executed. The memory 630 is provided as an electrically erasable and programmable read only memory (EEPROM), a flash memory (FM), or a hard disk drive.

In accordance with the exemplary embodiment of the present invention, the memory 630 stores the state information of the vehicle, and a map of discharge amounts of water at the anode, a map of amounts of saturated vapor and a map of flow rates of discharged air, which are used to calculate the amount of water in the humidifier.

The method in accordance with the above-described embodiment may be implemented as a computer executable program and stored in a computer readable recording medium. The computer readable recording medium may be one of a ROM, a RAM, a CD-ROM, a magnetic tape, a floppy disk, an optical data storage device, etc. Further, the computer readable recording medium may be realized in the form of a carrier wave (for example, transmission over the Internet).

The computer readable recording medium may be distributed to computer systems connected by a network and be stored and executed as code which is readable by computers in a distributed manner. Further, functional programs, code and code segments to implement the above-described method may be easily deduced by programmers in the art to which the embodiments pertain.

As apparent from the above description, a fuel cell control method and apparatus through estimation of an amount of water in accordance with the present invention has effects, as follows.

First, the fuel cell control method and apparatus of the present invention estimate an amount of water in a humidifier and remove unnecessary water (produced water), thus preventing closing of an air flow path (the tube side) of the humidifier due to freezing of water during parking in winter or physical damage to the humidifier.

Second, the fuel cell control method and apparatus of the present invention remove excessively accumulated water, thus preventing flooding due to water in the humidifier when a vehicle is being driven after parking for a long time (water excessively accumulated in the humidifier is not removed and water at the shell side is absorbed into the tube side of the humidifier and thus introduced into a fuel cell stack during air blowing).

Third, the fuel cell control method and apparatus of the present invention increase the RPM of an air blower at a braking time if discharge of water in the humidifier is required during driving so as to minimize generation of noise and a sense of difference in driving, and particularly uses regenerative braking energy, thus expecting fuel efficiency enhancement.

Fourth, the fuel cell control method and apparatus of the present invention estimate the amount of water in the humidifier, judge humidity of air in a fuel cell stack mounted in the vehicle, and prevent lowering of humidification efficiency of the fuel cell vehicle caused by accumulated water (produced water) using a heater in the humidifier if it is judged that air in the fuel cell stack is not suitable for reaction of the fuel cell (in a dry state), thereby enhancing performance and durability of the fuel cell stack.

Fifth, the fuel cell control method and apparatus of the present invention estimate the amount of water in the humidifier using information of sensors mounted in conventional vehicles and maps acquired by logic and a result of a vehicle test, thereby achieving cost reduction.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A fuel cell control method, comprising the steps of:
   calculating an amount of water in a humidifier using a production amount of water at a cathode of a fuel cell, a discharge amount of saturated vapor, and a discharge amount of water at an anode;
   judging humidity of air in a fuel cell stack; and
   controlling the amount of water in the humidifier using the humidity of air in the fuel cell stack.

2. The fuel cell control method according to claim 1, wherein the step of judging the humidity of air in the fuel cell stack includes:
   judging whether or not a vehicle is in a driving state using state information of the vehicle; and
   judging the humidity of air in the fuel cell stack, upon judging that the vehicle is in the driving state.

3. The fuel cell control method according to claim 2, wherein the step of controlling the amount of water in the humidifier includes:
   if the humidity of air in the fuel cell stack satisfies first conditions, increasing an RPM of an air blower from a first RPM to a second RPM and activating the air blower when the amount of water in the humidifier is greater than a first threshold and at least a second condition is satisfied; and
   if the humidity of air in the fuel cell stack does not satisfy the first conditions, activating a heater in the humidifier when the amount of water in the humidifier is greater than a second threshold,
   wherein the first RPM varies based on an air Stoichiometric Ratio (SR).

4. The fuel cell control method according to claim 3, wherein the first condition is satisfied if the humidity of air in the fuel cell stack is higher than a threshold humidity.

5. The fuel cell control method according to claim 3, wherein the second condition is satisfied if the vehicle is braked.

6. The fuel cell control method according to claim 2, further comprising the step of:
   upon judging that the vehicle is not in the driving state, increasing the RPM of the air blower from the first RPM to the second RPM and activating the air blower when the amount of water in the humidifier is greater than the first threshold.

7. The fuel cell control method according to claim 6, wherein the step of calculating the amount of water in the humidifier includes:
   calculating the discharge amount of saturated vapor using a temperature of the fuel cell stack and a flow rate of discharged air,
   wherein the flow rate of discharged air is calculated using the RPM of the air blower and an opening angle of an air pressure adjustment valve.

8. The fuel cell control method according to claim 7, wherein the step of calculating the amount of water in the humidifier further includes:
   calculating an amount of saturated vapor using a map of saturated vapor distribution according to temperatures of the fuel cell stack and flow rates of discharged air; and
   calculating the flow rate of discharged air using a map of flow rates of discharged air according to RPMs of the air blower and opening angles of the air pressure adjustment valve.

9. The fuel cell control method according to claim 7, wherein the step of calculating the amount of water in the humidifier further includes:
   calculating the discharge amount of saturated vapor based on a discharged water amount correction factor based on a gradient of the vehicle.

10. The fuel cell control method according to claim 6, wherein the step of calculating the amount of water in the humidifier includes:
    calculating the discharge amount of water at the anode using a number of operations of a drain valve, an operating time of the drain valve, and a discharge pressure.

11. The fuel cell control method according to claim 10, wherein the step of calculating the discharge amount of water at the anode using the number of operations of the drain valve, the operating time of the drain valve, and the discharge pressure further includes:
    calculating the discharge amount of water at the anode using a map of discharge amounts of water at the anode according to the numbers of operations of the drain valve, operating times of the drain valve, and discharge pressures.

12. The fuel cell control method according to claim 1, wherein the step of calculating the amount of water in the humidifier includes:
    calculating the production amount of water at the cathode using a current amount of water in the fuel cell stack and a chemical reaction time in the fuel cell stack.

13. A fuel cell control apparatus, comprising:
   a communication unit configured to receive information about a fuel cell stack and state information of a vehicle;
   a memory configured to store information received from the communication unit; and
   a controller configured to calculate an amount of water in a humidifier using a production amount of water at a cathode of a fuel cell, a discharge amount of saturated vapor and a discharge amount of water at an anode, to judge humidity of air in the fuel cell stack, and to control the amount of water in the humidifier using the humidity of air in the fuel cell stack.

14. The fuel cell control apparatus according to claim 13, wherein the controller judges the humidity of air in the fuel cell stack if the vehicle is in a driving state, and increases RPM of an air blower from a first RPM to a second RPM and activates the air blower when the amount of water in the humidifier is greater than a first threshold and at least a second condition is satisfied, if the humidity of air in the fuel cell stack satisfies first conditions, or activates a heater in the humidifier when the amount of water in the humidifier is greater than a second threshold, if the humidity of air in the fuel cell stack does not satisfy the first conditions, wherein the first RPM is varied based on an air Stoichiometric Ratio (SR).

15. The fuel cell control apparatus according to claim 13, wherein the controller judges that the first conditions are satisfied if the humidity of air in the fuel cell stack is higher than a threshold humidity.

16. The fuel cell control apparatus according to claim 13, wherein the controller judges that the second condition is satisfied if the vehicle is braked.

17. The fuel cell control apparatus according to claim 13, wherein, if the vehicle is not in the driving state, the controller increases the RPM of the air blower from the first RPM to the second RPM and activates the air blower when the amount of water in the humidifier is greater than the first threshold.

18. The fuel cell control apparatus according to claim 13, wherein the controller calculates the production amount of water at the cathode using a current amount of the fuel cell stack and a chemical reaction time in the fuel cell stack.

19. The fuel cell control apparatus according to claim 13, wherein the controller:
    calculates the discharge amount of saturated vapor using a temperature of the fuel cell stack and a flow rate of discharged air; and
    calculates the flow rate of discharged air using the RPM of the air blower and an opening angle of an air pressure adjustment valve.

20. The fuel cell control apparatus according to claim 13, wherein the controller calculates the discharge amount of saturated vapor based on a discharged water amount correction factor based on a gradient of the vehicle.

21. The fuel cell control apparatus according to claim 13, wherein the controller calculates the discharge amount of water at the anode using the number of operations of a drain valve, an operating time of the drain valve, and a discharge pressure.

* * * * *